United States Patent
Foucart et al.

(10) Patent No.: US 7,522,977 B2
(45) Date of Patent: Apr. 21, 2009

(54) METHOD AND A DEVICE FOR ASSISTING THE PILOTING OF AN AIRCRAFT DURING AN APPROACH PHASE

(75) Inventors: Vincent Foucart, Ramonville Saint Agne (FR); Eric Albert, Pamiers (FR); Patrice Gonzalez, Toulouse (FR)

(73) Assignee: AIRBUS France, Toulouse (FR)

( * ) Notice: Subject to any disclaimer, the term of this patent is extended or adjusted under 35 U.S.C. 154(b) by 404 days.

(21) Appl. No.: 11/394,200

(22) Filed: Mar. 31, 2006

(65) Prior Publication Data
US 2006/0224281 A1 Oct. 5, 2006

(30) Foreign Application Priority Data
Apr. 4, 2005 (FR) .................................. 05 03271

(51) Int. Cl.
G05D 1/10 (2006.01)
G05D 1/02 (2006.01)

(52) U.S. Cl. ........................... 701/16; 701/23; 701/120; 701/3; 342/33; 342/410; 342/413; 348/117; 340/972; 340/973; 340/976; 340/980

(58) Field of Classification Search .................... 701/16, 701/17, 18, 120; 342/33, 410, 413; 348/117; 340/972, 973, 976
See application file for complete search history.

(56) References Cited

U.S. PATENT DOCUMENTS

| 4,057,782 A | | 11/1977 | Muller | |
|---|---|---|---|---|
| 4,368,517 A | * | 1/1983 | Lovering | 701/16 |
| 5,420,582 A | * | 5/1995 | Kubbat et al. | 340/974 |
| 5,745,054 A | | 4/1998 | Wilkens | |
| 6,567,014 B1 | * | 5/2003 | Hansen et al. | 340/980 |
| 2003/0132860 A1 | * | 7/2003 | Feyereisen et al. | 340/973 |
| 2004/0183698 A1 | * | 9/2004 | Rouquette et al. | 340/972 |

OTHER PUBLICATIONS

Preliminary Search Report dated Dec. 8, 2005.
E. Ulbrich; "The Next Step Toward Enhanced Situational Awareness," Digital Avionics Systems Conference, 1997, 16th DASC., AIAA/IEEE Irvine, CA, USA, Oct. 26-30, 1997, New York, NY, IEEE, vol. 1, Oct. 26, 1997, XP010256024, ISBN: 0-7803-4150-3, pp. 3.1-8 thru 3.1-20.

(Continued)

*Primary Examiner*—Thomas G Black
*Assistant Examiner*—Lin B Olsen
(74) *Attorney, Agent, or Firm*—Dickinson Wright, PLLC

(57) ABSTRACT

A method for landing an aircraft includes determining the aircraft's deviation from its approach path so as to define a first point of the aircraft's heading. A first straight line passing through the first point and through a second point defining the ground orientation of the approach path is displayed, by a head-up display, on a horizon line with a heading scale. The first straight line represents a ground plot of the approach path. A first assistance gate is displayed such that the first straight line passes through the first assistance gate when the aircraft is aligned on the approach path. A second straight line, parallel with the horizon line and passing through the first point, is displayed and represents a plot on the ground of the origin of the approach path. A second assistance gate is displayed under the horizon line and represents the slope of the approach path.

18 Claims, 6 Drawing Sheets

OTHER PUBLICATIONS

J. Rong, et al.; "Onboard Pilot Decision Aid For High Volume Operations In Self-Controlled Airspace," Digital Avionics Systems Conference, 2004, DASC 04, the 23rd Salt Lake City, UT, USA, Oct. 24-28, 2004, Piscataway, NJ, USA, IEEE, vol. 1, Oct. 24, 2004, pp. 4B5-41, XP010764985, ISBN: 0-7803-8539-X, pp. 4.B.5-1 thru 4.B.5-12.

* cited by examiner

METHOD AND A DEVICE FOR ASSISTING THE PILOTING OF AN AIRCRAFT DURING AN APPROACH PHASE

FIELD OF THE INVENTION

The invention relates to a method and a device for assisting the piloting of an aircraft during an approach phase for the purpose of landing on a landing runway.

SUMMARY OF THE INVENTION

According to the invention, said method is noteworthy in that the following series of successive steps is carried out in an automatic and repetitive manner:

a) there is determined a first angular deviation which corresponds to an angular deviation in a horizontal plane between: (1) a straight line passing through the actual position of the aircraft and through a point of origin of a first approach (or approach aid) path and (2) said first approach path which depends on the landing runway;

b) there is determined a second angular deviation which corresponds to an angular deviation in a vertical plane between: (1) a straight line passing through the actual position of the aircraft and through a point of origin of a second approach (or approach aid) path and (2) said second approach path which also depends on the landing runway;

c) there is determined, using said first and second angular deviations, a first point depending on the heading of the aircraft;

d) there is displayed on a display screen of a head-up display device of the aircraft, superimposed on the environment seen in front of the aircraft, a first straight line, passing through this first point and through a second point, which first straight line illustrates the orientation on the ground of the first approach path, seen from the aircraft, and which first straight line is placed on a horizon line provided with a heading scale, relative to the heading of the aircraft, said first straight line representing in a true manner the plot on the ground of said first approach path;

e) there is displayed on the display screen a first assistance gate such that said first straight line passes through this first assistance gate when the aircraft is aligned on said first approach path;

f) there is displayed on the display screen a second straight line, parallel with the horizon line and passing through said first point, this second straight line representing in a true manner the plot on the ground of the ending (on the ground) of said second approach path;

g) there is displayed on the display screen a second assistance gate under the horizon line and representing the slope of said second approach path, seen from the aircraft. The aircraft is situated on said second approach path when said second straight line passes through said second assistance gate; and Thus, due to the invention, the pilot is shown on a display screen of a head up device of the HUD (Head Up Display) type:

- a first line which is shown superimposed on the plot on the ground of said first approach path described below, which depends on the landing runway and which preferably illustrates the center line of said landing runway. With this first line there is associated a first assistance gate which is such that said first line passes through this first assistance gate when the aircraft is aligned on said first approach path;
- a second line which is shown superimposed on the plot on the ground of the end (on the ground) of said second approach path. This second line is associated with a second assistance gate which is such that said second line passes through this second assistance gate when the aircraft is aligned on said second approach path; and
- a synthetic runway which is shown superimposed on the landing runway.

Consequently, on looking outside of the aircraft through said display screen, the pilot knows where he is with respect to said first and second approach paths and to said landing runway. This information therefore assists him during the approach to the landing runway for the purpose of landing the aircraft.

Advantageously, in step c), a lateral deviation value and an elevation value are calculated with the help of said first and second angular deviations respectively, and said first point is determined with the help of said lateral deviation and elevation values, said first point being defined with respect to the heading of said aircraft presented on said horizon line provided with the heading scale, and this is done horizontally according to said lateral deviation value and vertically according to said elevation value.

Advantageously, said lateral deviation value DEVL is calculated using the following expression:

$$DEVL = A1 + LOCDEV$$

in which:

A1 represents a known angular deviation in a horizontal plane between the heading of the aircraft and the orientation of said first approach path; and LOCDEV represents said first angular deviation.

Moreover, advantageously, said elevation value Vsite is calculated using the following expression:

$$V\text{site} = A2 + GSDEV$$

in which:

A2 represents a known angular deviation in a vertical plane between said second approach path and the horizontal; and GSDEV represents said second angular deviation.

In a first preferred embodiment, said first and second approach paths respectively correspond to a lateral alignment beam and a descent alignment beam which are transmitted by a usual precision approach system, and in steps a) and b) said first and second angular deviations respectively are measured in the usual way from the aircraft.

Such a precision approach system represents, in the usual way, a radio-navigation system transmitting signals from the ground.

It is known that many airports are equipped with such a radio-navigation system on the ground, which transmits signals making it possible to carry out a precision instrument landing of the "ILS" (Instrument Landing System) type, or the equivalent, of an aircraft, in particular of a transport aircraft, equipped with appropriate receivers, such as specified below.

Such a radio-navigation system provides great and efficient assistance to the landing (by a lateral guidance and a vertical guidance), in particular in poor visibility (fog, etc) or in the absence of visibility.

Moreover, in a second embodiment, said first and second approach paths respectively correspond to a lateral alignment beam and to a descent alignment beam which are determined by a usual non-precision approach aid system.

In the context of the present invention, the term "non-precision approach" refers to an approach which is not a precision instrument approach of the aforesaid ILS (Instrument Landing System) type. A non-precision approach exists when information used during a precision approach is not available, at least in part, such that a normal precision approach cannot be implemented. In order to implement a non-precision approach, it is necessary to determine a virtual path (defined at least with the help of two approach paths) corresponding to the theoretical path that the aircraft has to follow during that approach. The guidance of the aircraft then consists in trying to cancel out possible deviations between the actual position of the aircraft and the position that it would have if it were on this virtual path.

Moreover, in a preferred embodiment of the present invention, said heading scale is reset by shifting it laterally in such a way as to align said second point on a route followed by the aircraft during the final approach phase.

Such a resetting makes it possible to ensure the conformity of the display used by the present invention and its purpose is to correct the magnetic declination of the magnetic heading coming from the inertial systems of the aircraft. It is known that inertial systems measure a geographic heading (true heading) using a magnetic declination table to provide the magnetic heading which is used in the present invention. As this magnetic declination table is not very frequently updated, there can be a significant deviation between the declination of the table and the real declination at the place and on the day the invention is used in an approach over a given terrain. Such a deviation results in a shift that can be as much as a few degrees between the heading scale displayed on the display screen and the real headings. On correcting this magnetic declination error, the heading scale is therefore reset laterally with respect to the real runway.

In order to do this, according to the invention, account is taken of the fact that, during the approach, the aircraft is guided with the help of said first approach path which is associated with the landing runway. The mean route of the aircraft therefore follows the orientation of this first approach path. The correction therefore consists in resetting the heading scale presented on the display screen of the head up display device by shifting it laterally in such a way as to align said abovementioned second point on the (mean) route followed by the aircraft during the approach phase, as mentioned above.

In a first embodiment, said resetting is carried out by taking account of a current heading determined for predetermined flight conditions.

In a second embodiment, an error due to a magnetic declination is estimated just once and the resetting is then carried out by taking account of the error thus estimated.

In a third embodiment, the resetting is carried out by taking account of a heading calculated using the following expression:

$$Rc = \text{arctg}\left[\left(\int_{t0}^{t1} GS(t) \cdot \sin R(t) \cdot dt\right) \Big/ \left(\int_{t0}^{t1} GS(t) \cdot \cos R(t) \cdot dt\right)\right]$$

in which:
  arctg represents the inverse of the tangent;
  GS(t) is a current ground speed of the aircraft;
  R(t) is a current heading of the aircraft; and
  t0 and t1 are two particular times where the aircraft crosses a lateral alignment beam.

The present invention also relates to a device for assisting the piloting of an aircraft, in particular a transport aircraft, during a phase of approach towards a landing runway for the purpose of a landing.

According to the invention, said device is noteworthy in that it comprises:
  a first means for determining a first angular deviation which corresponds to an angular deviation in a horizontal plane between: (1) a straight line passing through the actual position of the aircraft and through a point of origin of a first approach path and (2) said first approach path which depends on the landing runway;
  a second means for determining a second angular deviation which corresponds to an angular deviation in a vertical plane between: (1) a straight line passing through the actual position of the aircraft and through a point of origin of a second approach path and (2) said second approach path which also depends on the landing runway;
  a central unit for determining, using said first and second angular deviations, a first point depending on the heading of the aircraft; and
  a head up display device for displaying on a display screen, superimposed on the environment seen in front of the aircraft:
  a first straight line, passing through this first point and through a second point, which first straight line illustrates the orientation on the ground of said first approach path, seen from the aircraft, and which first straight line is placed on a horizon line provided with a heading scale, relative to the heading of the aircraft, said first straight line representing in a true manner the plot on the ground of said first approach path;
  a first assistance gate such that said first straight line passes through this first assistance gate when the aircraft is aligned on said first approach path;
  a second straight line, parallel with the horizon line and passing through said first point, this second straight line representing in a true manner the plot on the ground of the ending (on the ground) of said second approach path;
  a second assistance gate placed under the horizon line and representing the slope of said second approach path, seen from the aircraft; and
  a synthetic runway, defined around said first point, this synthetic runway representing in a true manner the plot on the ground of the sides of the landing runway where said approach paths end.

In a first embodiment, said first and second means are part of at least one detector of a precision approach system.

In a second embodiment, said first and second means are part of a non-precision approach aid system.

Furthermore, in a preferred embodiment, the device according to the invention comprises, in addition, a third means for resetting said heading scale by shifting it laterally in such a way as to align said second point on a route followed by the aircraft during the approach phase.

BRIEF DESCRIPTION OF THE DRAWINGS

The figures of the appended drawing will give a good understanding of how the invention may be embodied. In these figures, identical references denote similar elements.

DETAILED DESCRIPTION OF THE INVENTION

Figure 1:
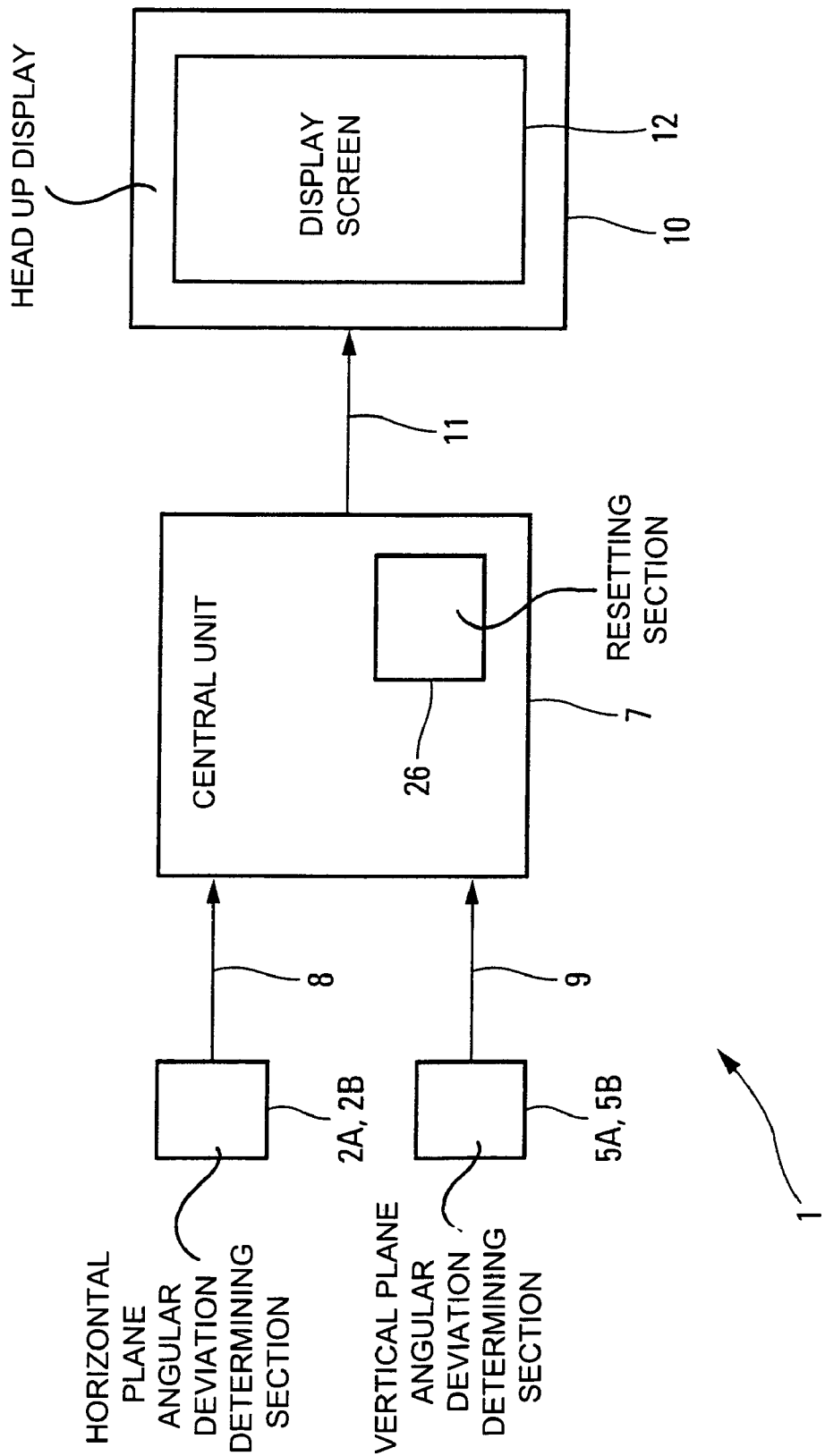
FIG. 1 is the block diagram of an aid device according to the invention.

The device 1 according to the invention and shown diagrammatically in FIG. 1 is intended to assist a pilot of an aircraft A, in particular of a transport aircraft, in piloting said aircraft A during an approach phase, for the purpose of a landing on a landing runway (not shown).

Figure 2:
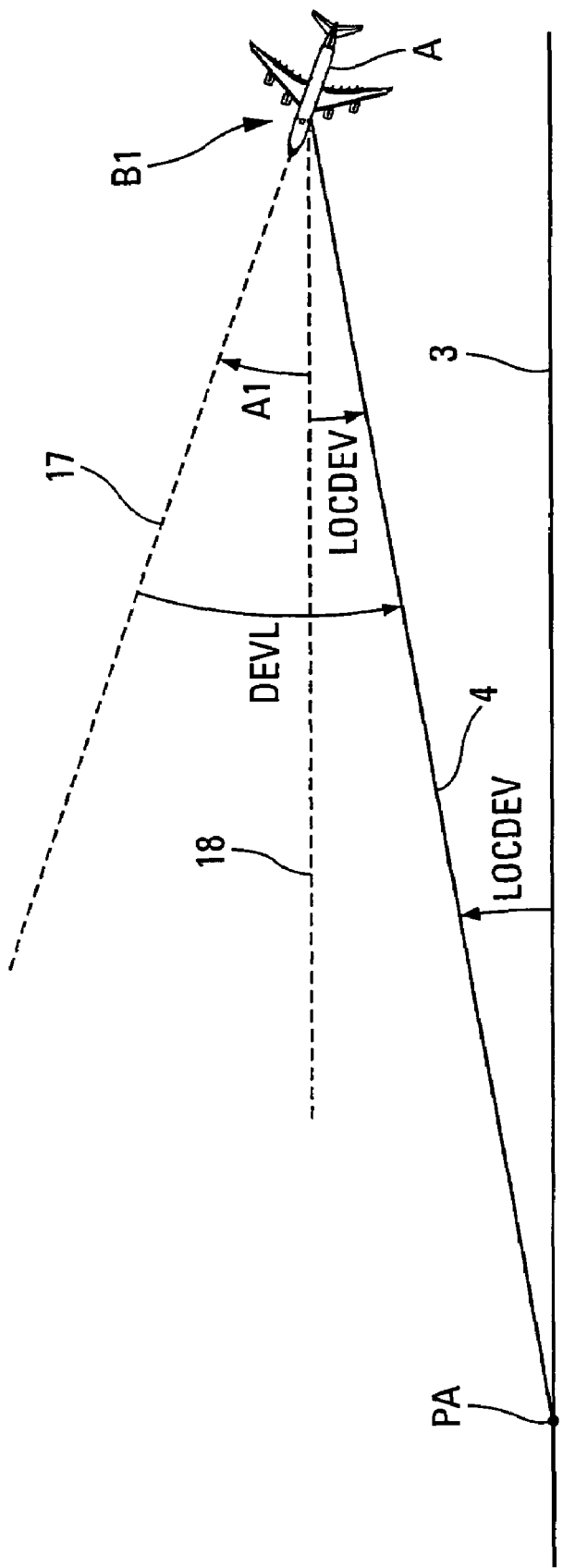
FIGS. 2 to 4 are illustrations making it possible to explain the method of determining a true displayed line.
Figure 3:
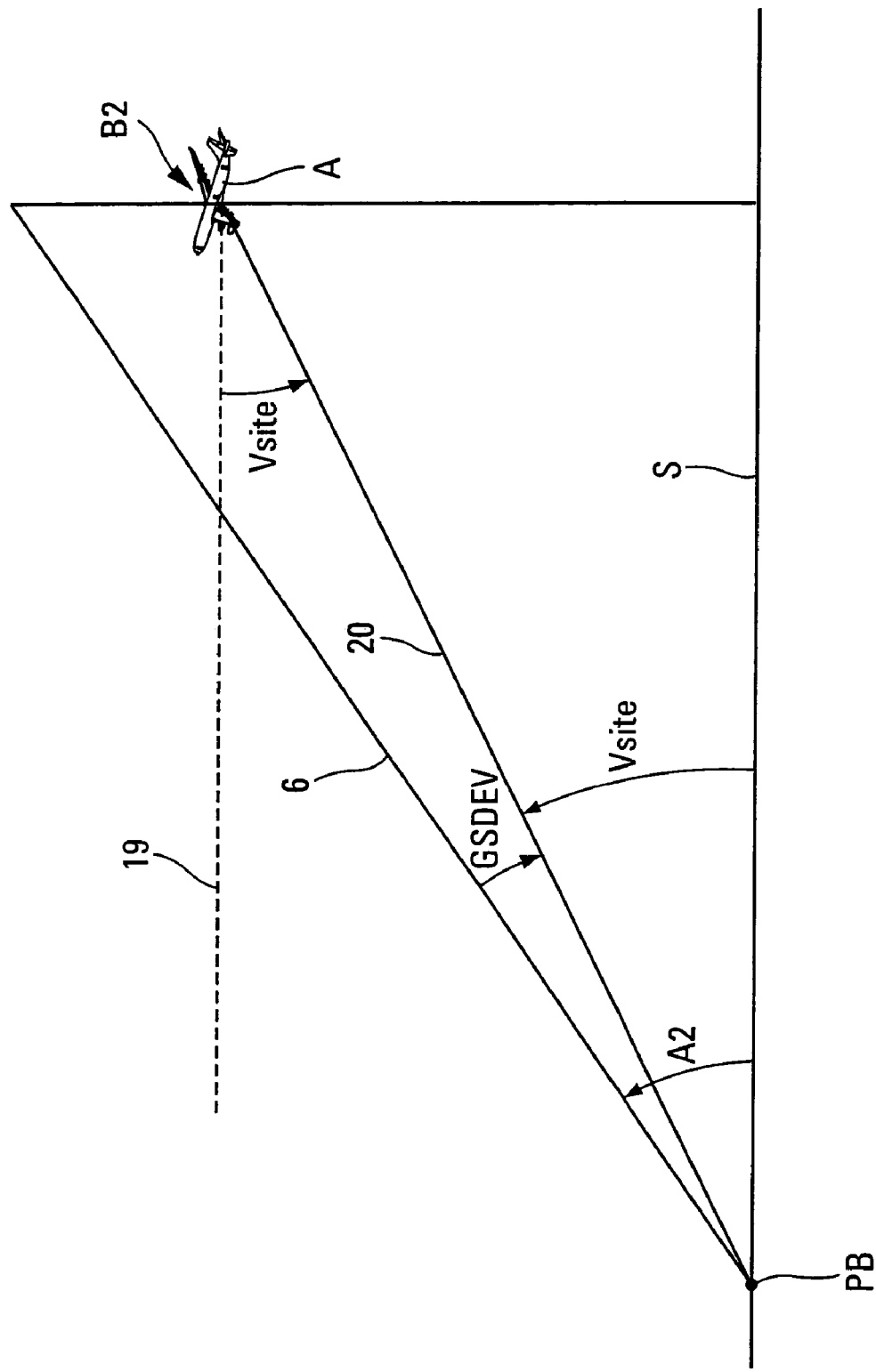

According to the invention, said device 1 which is installed on the aircraft A, comprises:

- a means 2A, 2B for determining an angular deviation LOCDEV which corresponds to an angular deviation in a horizontal plane between: (1) a straight line 4 passing through the actual position B1 of the aircraft A and through a point PA of origin of an approach path 3 and (2) said approach path 3 defined below and tied to the landing runway, as shown in FIG. 2;
- a means 5A, 5B for determining an angular deviation GSDEV which corresponds to an angular deviation in a vertical plane between: (1) a straight line 20 passing through the actual position B2 of the aircraft A and through a point PB of origin on the ground of an approach path 6 and (2) said approach path 6 defined below and tied to the landing runway, as shown in FIG. 3;
- a central unit 7 which is connected by the intermediary of links 8 and 9 respectively to said means 2A, 2B and to said means 5A, 5B and which is intended to determine in the manner described hereafter, using said angular deviations LOCDEV and GSDEV, a point P1 which depends on the heading (illustrated by a line 17 in FIG. 2) of the aircraft A; and
- a head up display device 10 of the HUD (Head Up Display) type, which is connected by the intermediary of a link 11 to said central unit 7 and which displays the indications determined by said central unit 7.

Figure 4:
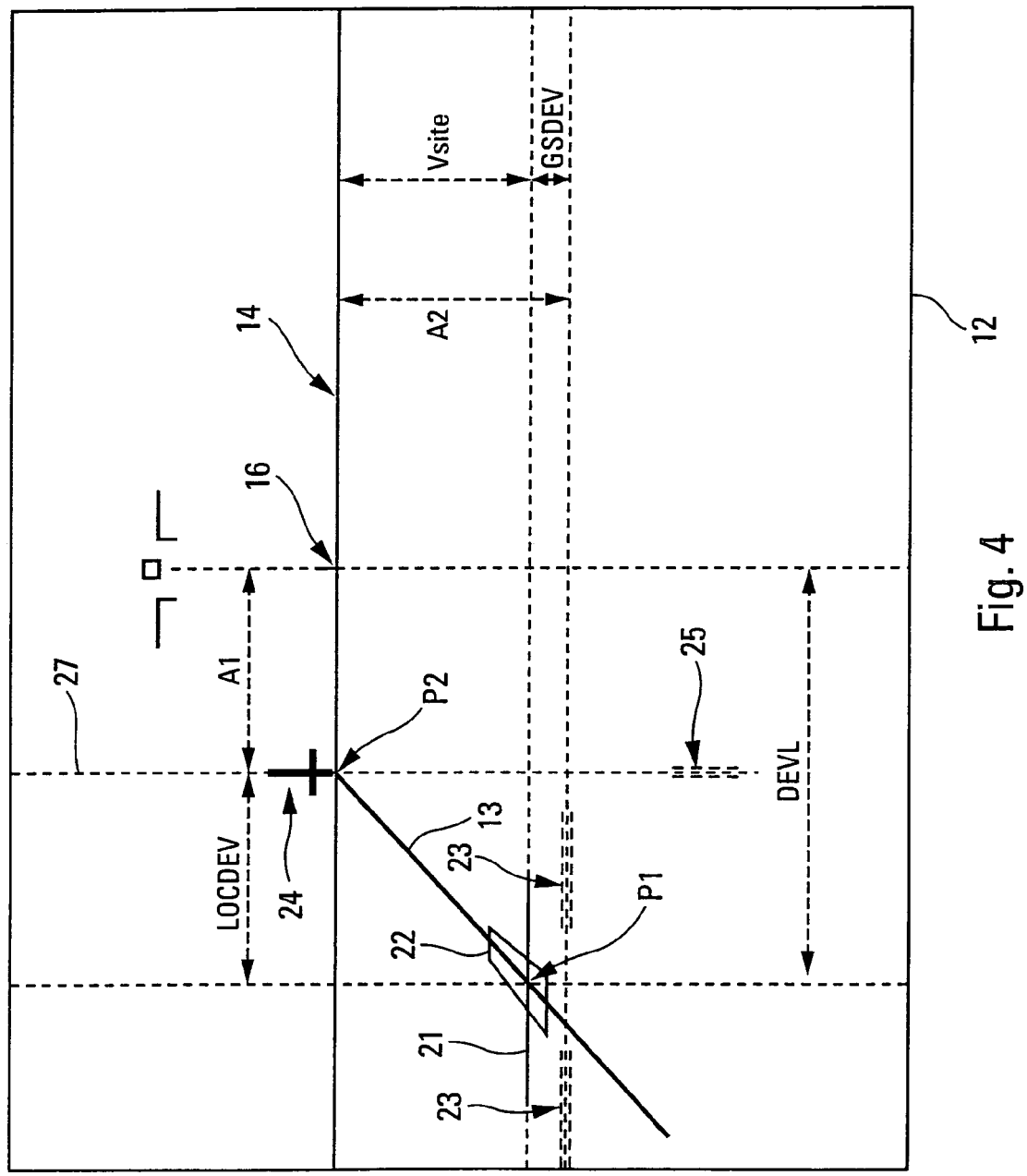
Figure 5:
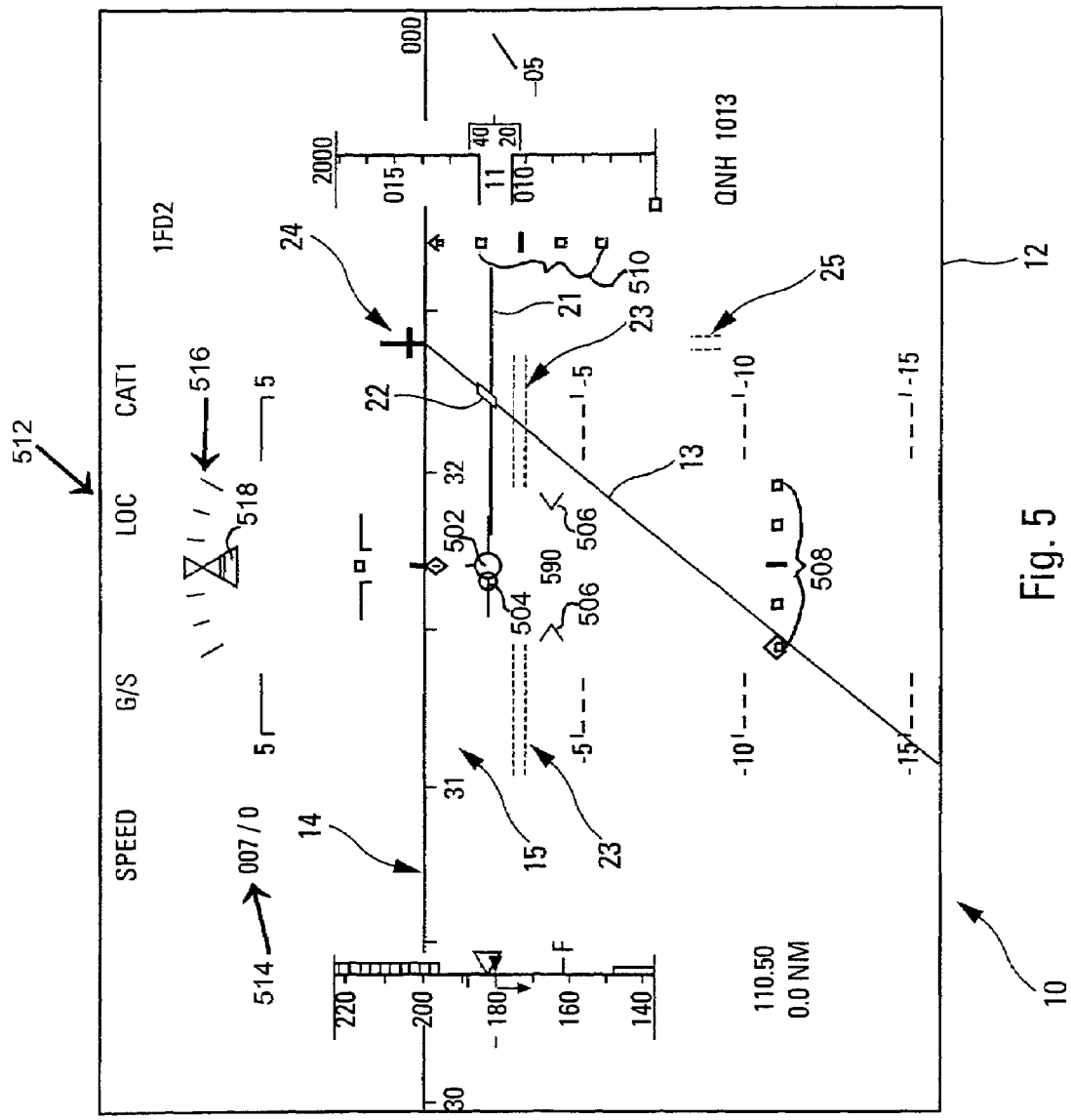
FIGS. 5 and 6 diagrammatically represent a display screen showing information presented according to the invention, for a precision approach of the "ILS" type (or equivalent) and for a non-precision approach respectively.

Said display device 10 displays on a display screen 12, superimposed on the environment seen in front of the aircraft A, as shown in FIG. 4:

- a straight line 13 passing through this point P1, and through a point P2:
  - which point P2 is indicated by a symbol 24;
  - which straight line 13 shows the orientation on the ground of said approach path 3 (or line 18), seen from the aircraft A; and
  - which point P2 is placed on a horizon line 14 (which is provided with a heading scale 15, as illustrated in FIG. 5) relative to the heading 16 of the aircraft A. Said straight line 13 represents in a true manner the plot on the ground of said approach path 3;
- a first assistance gate 25, defined below, such that said straight line 13 passes through this first assistance gate 25, when the aircraft A is aligned on said approach path 3;
- a straight line 21, parallel with the horizon line 14 and passing through the point P1, this straight line 21 representing in a true manner the plot on the ground of the ending on the ground of said approach path 6;
- a second assistance gate 23, defined below, placed under the horizon line 14 and representing the slope of the approach path 6, seen from the aircraft A. The straight line 21 passes through this second assistance gate 23, when the aircraft A is aligned on said approach path 6; and
- a synthetic runway 22 defined around said point P1, this synthetic runway 22 representing in a true manner the plot on the ground of the sides of the landing runway where said approach paths 3 and 6 end.

Consequently, the pilot, looking out of the aircraft A through said display screen 12, knows where he is with respect to these approach paths 3 and 6 and also with respect to the landing runway. This information therefore provides the pilot with simple and effective assistance during the approach to said landing runway.

According to the invention, said central unit 7 calculates a lateral deviation value DEVL (defined between the lines 17 and 4, as shown in FIG. 2) from said angular deviation LOCDEV, and an elevation value Vsite (defined between a horizontal line 19 and the straight line 20, as shown in FIG. 3) from said angular deviation GSDEV. It then determines said point P1 using said lateral deviation value DEVL and said elevation value Vsite. This point P1 is defined with respect to the heading 16 of said aircraft A which is shown on said horizon line 14 provided with the heading scale 15, and this is done horizontally according to said lateral deviation value DEVL and vertically according to said elevation value Vsite, as shown in FIG. 4.

In order to do this, the central unit 7 calculates said lateral deviation value DEVL using the following expression:

$$DEVL = A1 + LOCDEV$$

in which A1 represents an angular deviation in a horizontal plane between the heading of the aircraft A illustrated by the line 17 (FIG. 2) and the orientation of said approach path 3, illustrated by the line 18.

Furthermore, said central unit 7 calculates said elevation value Vsite using the following expression:

$$Vsite = A2 + GSDEV$$

in which A2 represents an angular deviation in a vertical plane between said approach path 6 and the ground S, assumed to be horizontal (FIG. 3).

In a particular embodiment, the central unit 7 determines said first assistance gate 25 and the display device 10 displays this first assistance gate 25 on said display screen 12 in the form of a characteristic sign 25. Said assistance gate 25 is such that said line 13 passes through said characteristic sign 25 on said display screen 12 when the aircraft A is aligned on said approach path 3. In order to do this, said first assistance gate 25 is plotted on a straight line 27 perpendicular to the horizon line 14, passing through the point P2. The position of said line 13 with respect to said characteristic sign 25 (therefore illustrating said first assistance gate 25) thus makes it possible to indicate to the pilot, if necessary, which side (left or right) the aircraft A is on with respect to said approach path 3.

Furthermore, said second assistance gate 23 (illustrated by at least one characteristic sign 23) is provided, positioned under the horizon line 14, on the slope scale, at a slope value A2 corresponding to said angular deviation in the vertical plane between said approach path 6 and the horizontal S. This second assistance gate 23 is such that said line 21 passes through said characteristic sign 23 on said display screen 12 when the aircraft A is aligned on said approach path 6. The position of said line 21 with respect to said characteristic sign 23 (therefore illustrating said assistance gate 23) thus makes it possible to indicate to the pilot, if necessary, which side (above or below) the aircraft A is on with respect to said approach path 6.

Furthermore, said synthetic runway 22 is plotted in perspective around the point P1, from known values of runway length, runway width, orientation of the runway (OFU) and altitude of the runway.

In a preferred first embodiment, said approach paths 3 and 6 respectively correspond to a lateral alignment beam and a descent alignment beam which are transmitted by a usual precision approach system. Also, said means 2A, 5A are part of said precision approach system and are intended for measuring, in the usual way, the angular deviations LOCDEV and GSDEV respectively, from the aircraft A.

Such a precision approach system generally corresponds to a ground based radio-navigation system which transmits signals making it possible to carry out a precision instrument landing, of the "ILS" (Instrument Landing System) type or equivalent, of any aircraft A which is equipped with appropriate receivers 2A, 5A.

FIG. 5 shows a display used according to the invention for such a first embodiment (relating to a precision approach).

In this case, the display device 10 can display the lines 13 and 21 at the same time as the usual display indications, in particular:
- a speed vector 502 (round symbol with a fin and wings);
- a flight director 504 (round to the left of the speed vector);
- a radio altitude ("590");
- a total slope 506 (chevrons situated to the left and to the right of the radio altitude);
- a lateral deviation scale 508 (at the bottom) and a vertical deviation scale 510 (to the left of the altitude);
- the usual "ILS" frequency and "DME" distance (bottom left);
- a barometric altitude reference (bottom right);
- an indicator showing the automatic pilot modes 512;
- the wind 514 ("007/0"); and
- a roll scale 516 as well as associated sideslip information 518 (trapezium under the triangle).

In this first embodiment, the lines 13 and 21, which illustrate said true representations, for a precision approach, are shown in continuous line on the display screen 12.

Furthermore, in a second embodiment, said approach paths 3 and 6 respectively correspond to a lateral alignment beam and a descent alignment beam which are determined by a usual non-precision approach aid system (comprising said means 2B, 5B).

In the context of the present invention, the expression "non-precision approach" means an approach which is not a precision instrument approach, such as for example an approach of the "ILS" (Instrument Landing System) type mentioned above. A non-precision approach therefore exists when the aforesaid information (used during a precision approach) is not available, at least partly, such that a usual precision approach cannot be implemented. In order to implement a non-precision approach, it is necessary to determine a virtual path (defined with the help at least of the two approach paths 3 and 6), corresponding to the theoretical path that the aircraft A must follow during that approach. The guidance of the aircraft A then consists in trying to cancel out possible deviations between the actual position B1, B2 of the aircraft A and the position that it would have if it were on that virtual path.

Figure 6:
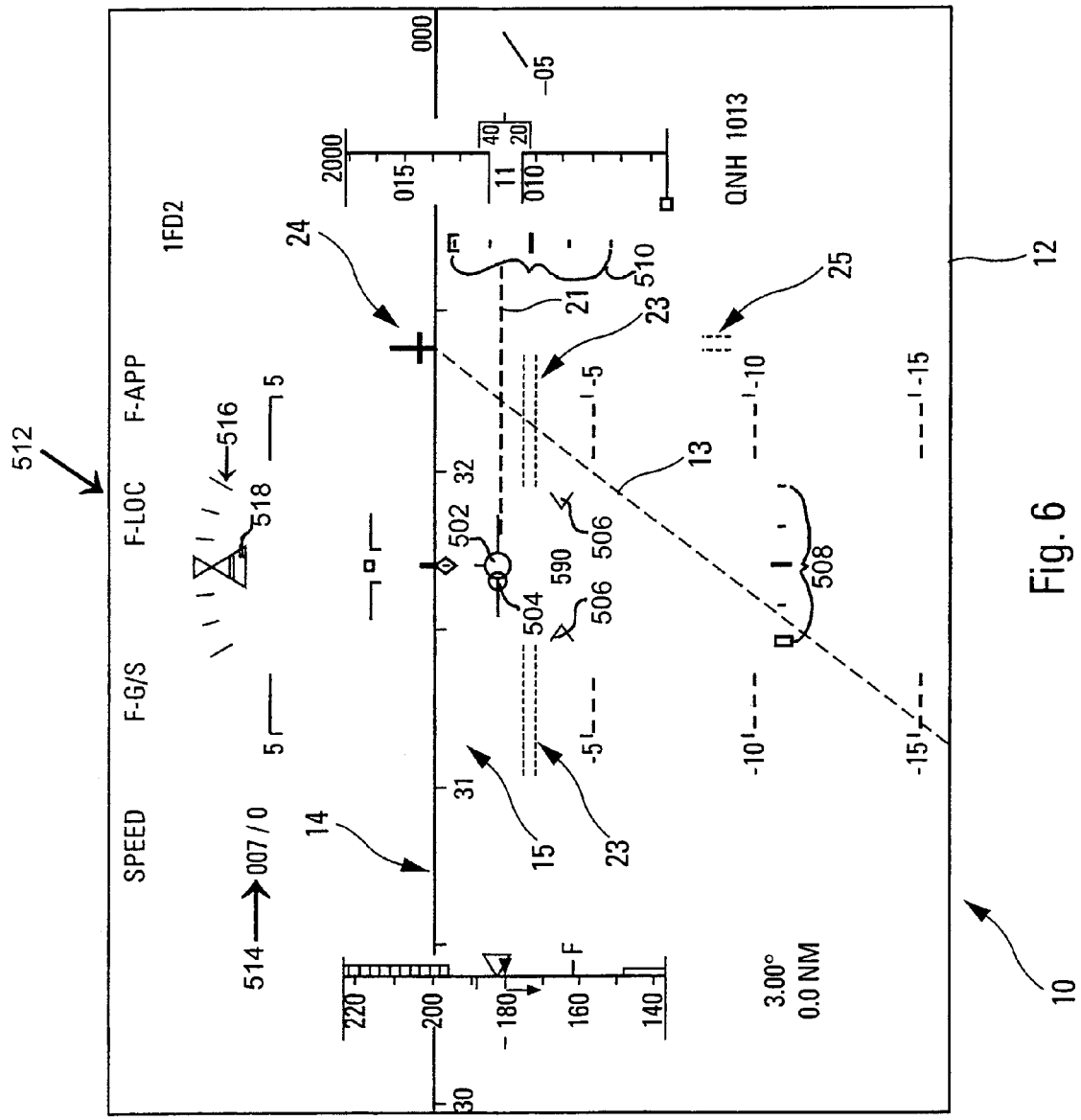

The display relating to this second embodiment is illustrated in FIG. 6. This FIG. 6 is similar to FIG. 5: the lines 13 and 21 are simply shown in dotted line in order to give a good indication that they correspond to a non-precision approach.

Furthermore, in a particular embodiment, the device 1 according to the invention comprises in addition a resetting means 26 to reset said heading scale 15 by shifting it laterally in such a way as to align said point P2 (symbol 24) on a route followed by the aircraft A during the approach phase.

Such a resetting makes it possible to ensure the truth of the display used by the present invention and its purpose is to correct the magnetic declination coming in the usual way from the inertial systems of the aircraft A. It is known that inertial systems measure a geographic heading (true heading) using a magnetic declination table to supply the magnetic heading which is used in the present invention. As this magnetic declination table is not updated very frequently, there can be a significant deviation between the declination of the table and the real declination at the place and on the day the invention is used in an approach over a given terrain. Such a deviation results in a shift that can be as much as a few degrees between the heading scale 15 shown in the display screen 12 and the real headings. By correcting this magnetic declination error, the resetting means 26 thus resets the heading scale 15 laterally with respect to the real runway. This therefore makes it possible to show the line 13 (which is defined with respect to said heading scale) in total conformity (or exact superimposition) with the real plot on the ground of the approach path 3, seen from the aircraft A.

In order to do this, according to the invention, said resetting means 26 takes account of the fact that, during the approach, the aircraft A is guided with the help of said approach path 3 which is associated with the landing runway. The mean route of the aircraft A therefore follows the orientation of this approach path 3. The correction therefore consists in resetting the heading scale 15 shown on the display screen 12 of the head up display device 10 by shifting it laterally in the previously mentioned way.

In order to do this, said resetting means 26 can use various resetting methods.

In a first embodiment, said resetting means 26 carries out the resetting (in an iterative manner), by taking account of a current route of the aircraft A, which is determined when the following flight conditions are verified:
- a usual guidance mode "LOC TRACK" is active, that is to say the aircraft A is guided following a usual lateral alignment beam of the "LOC" type (or approach path 3);
- the radio-altitude is below a predetermined value, for example 1500 feet (about 450 meters), that is to say the aircraft A is sufficiently close to the landing runway for the "LOC" beam to be substantially straight; and
- the roll angle of the aircraft A is below a predetermined value, for example 10°, that is to say the heading and the route of the aircraft A are substantially stable.

In a second embodiment, said resetting means 26 carries out just once an estimation of the error due to the magnetic declination and then it corrects this error thereafter during the display of the heading scale 15 and of the line 13. The estimation of the error is carried out, when the following conditions are achieved for a specified duration, for example for 10 seconds:
- the radio-altitude is below a predetermined value, for example 1500 feet (approximately 450 meters);
- the guidance mode "LOC TRACK" is active;
- the aircraft A is sufficiently close to the "LOC" beam; and
- the guidance requires only a slight lateral correction from the pilot, which indicates that the route of the aircraft A is well aligned on the orientation of the approach path 3.

The purpose of these conditions is to ensure that the aircraft A has followed a route very close to the orientation of the "LOC" beam during said predetermined duration, preferably during the last ten seconds.

Furthermore, in a third embodiment, said resetting means 26 carries out the resetting, taking account of a route that it calculates in a repetitive manner using the following expression:

$$Rc = \arctg\left[\left(\int_{t0}^{t1} GS(t)\cdot \sin R(t)\cdot dt\right) \Big/ \left(\int_{t0}^{t1} GS(t)\cdot \cos R(t)\cdot dt\right)\right]$$

in which:
  arctg represents the inverse of the tangent;
  GS(t) is a current ground speed of the aircraft A;
  R(t) is a current heading of the aircraft A; and
  t0 and t1 are two particular times.
More precisely:
  the time t0 corresponds to a first passing of the aircraft A through a virtually zero "LOC" (LOCDEV) deviation and at a radio-altitude lower than a predetermined value, for example 1500 feet (approximately 450 meters); and
  the time t1 corresponds to a second passing of the aircraft A through a virtually zero "LOC" (LOCDEV) deviation and at a radio-altitude lower than a predetermined value, for example 1500 feet (approximately 450 meters).

This calculated heading corresponds to the mean route followed by the aircraft A between the times t1 and t2 where the aircraft A has crossed the "LOC" beam.

The invention claimed is:

1. A method for assisting the piloting of an aircraft, during an approach phase, for the purpose of landing on a landing runway, wherein the following series of successive steps is carried out in an automatic and repetitive manner:
  a) determining a first angular deviation which corresponds to an angular deviation in a horizontal plane between: (1) a straight line passing through the actual position of the aircraft and through a point of origin of a first approach path and (2) said first approach path which depends on the landing runway;
  b) determining a second angular deviation which corresponds to an angular deviation in a vertical plane between: (1) a straight line passing through the actual position of the aircraft and through a point of origin of a second approach path and (2) said second approach path which also depends on the landing runway;
  c) determining, based on the first and second angular deviations, a first point that defines the location of the aircraft relative to the first and second approach paths;
  d) displaying on a display screen of a head-up display device of the aircraft, superimposed on the environment seen in front of the aircraft, a first straight line passing through this first point and through a second point, said second point illustrating the orientation on the ground of said first approach path, seen from the aircraft, and which is placed on a horizon line provided with a heading scale, relative to the heading of the aircraft, said first straight line representing in a true manner the plot on the ground of said first approach path;
  e) displaying on the display screen a first assistance gate such that said first straight line passes through this first assistance gate when the aircraft is aligned on said first approach path;
  f) displaying on the display screen a second straight line, parallel with the horizon line and passing through said first point, this second straight line representing in a true manner the plot on the ground of the origin on the ground of said second approach path;
  g) displaying on the display screen a second assistance gate placed under the horizon line and representing the slope of said second approach path, seen from the aircraft; and
  h) displaying on the display screen a synthetic runway, defined around said first point, this synthetic runway representing in a true manner the plot on the ground of the sides of the landing runway where said first and second approach paths originate.

2. The method as claimed in claim 1, wherein in step c) a lateral deviation value and an elevation value are calculated based on said first and second angular deviations respectively, and said first point is determined based on said lateral deviation and elevation values, said first point being defined with respect to the heading of said aircraft presented on said horizon line provided with the heading scale, and this is done horizontally according to said lateral deviation value and vertically according to said elevation value.

3. The method as claimed in claim 2, wherein said lateral deviation value, DEVL, is calculated using the following expression:

$DEVL = A1 + LOCDEV$ in which:
  A1 represents an angular deviation in a horizontal plane between the heading of the aircraft and the orientation of said first approach path; and
  LOCDEV represents said first angular deviation.

4. The method as claimed in claim 3, wherein said first and second approach paths respectively correspond to a lateral alignment beam and a descent alignment beam which are transmitted by a precision approach system, and wherein in steps a) and b) said first and second angular deviations are measured from the aircraft.

5. The method as claimed in claim 2, wherein said elevation value, Vsite, is calculated using the following expression:

$V\text{site} = A2 = GSDEV$ in which:
  A2 represents an angular deviation in a vertical plane between said second approach path and the horizontal; and
  GSDEV represents said second angular deviation.

6. The method as claimed in claim 5, wherein said first and second approach paths respectively correspond to a lateral alignment beam and a descent alignment beam which are transmitted by a precision approach system, and wherein in steps a) and b) said first and second angular deviations are measured from the aircraft.

7. The method as claimed in claim 2, wherein said first and second approach paths respectively correspond to a lateral alignment beam and a descent alignment beam which are transmitted by a precision approach system, and wherein in steps a) and b) said first and second angular deviations are measured from the aircraft.

8. The method as claimed in claim 1, wherein said first and second approach paths respectively correspond to a lateral alignment beam and a descent alignment beam which are transmitted by a precision approach system, and wherein in steps a) and b) said first and second angular deviations are measured from the aircraft.

9. The method as claimed in claim 1, wherein said first and second approach paths respectively correspond to a lateral alignment beam and to a descent alignment beam which are determined by a non-precision approach aid system.

10. The method as claimed in claim 1, wherein said heading scale is reset by shifting it laterally in such a way as to align said second point on a route followed by the aircraft during the approach phase.

11. The method as claimed in claim 10, wherein said resetting is carried out by taking account of a current route determined for predetermined flight conditions.

12. The method as claimed in claim 10, wherein an error due to a magnetic declination is estimated just once and the resetting is then carried out by taking account of the error thus estimated.

13. The method as claimed in claim 10, wherein the resetting is carried out by taking account of a heading calculated using the following expression:

$$Rc = \operatorname{arctg}\left[\left(\int_{t0}^{t1} GS(t) \cdot \sin R(t) \cdot dt\right) / \left(\int_{t0}^{t1} GS(t) \cdot \cos R(t) \cdot dt\right)\right]$$

in which:
arctg represents the inverse of the tangent;
GS(t) is a current ground speed of the aircraft;
R(t) is a current heading of the aircraft (A); and
t0 and t1 are two particular times where the aircraft crosses a lateral alignment beam.

14. A device for assisting the piloting of an aircraft during an approach phase for the purpose of a landing on a landing runway, the device comprising:
   a first means for determining a first angular deviation which corresponds to an angular deviation in a horizontal plane between: (1) a straight line passing through the actual position of the aircraft and through a point of origin of a first approach path and (2) said first approach path which depends on the landing runway;
   a second means for determining a second angular deviation which corresponds to an angular deviation in a vertical plane between: (1) a straight line passing through the actual position of the aircraft and through a point of origin of a second approach path and (2) said second approach path which also depends on the landing runway;
   a central unit for determining, based on the first and second angular deviations, a first point that defines the location of the aircraft relative to the first and second approach paths; and
   a head up display device for displaying on a display screen, superimposed on the environment seen in front of the aircraft:
      (i) a first straight line passing through the first point and through a second point which illustrates the orientation on the ground of said first approach path, seen from the aircraft, and which is placed on a horizon line provided with a heading scale, relative to the heading of the aircraft, said first straight line representing in a true manner the plot on the ground of said first approach path;
      (ii) a first assistance gate such that said first straight line passes through this first assistance gate when the aircraft is aligned on said first approach path;
      (iii) a second straight line, parallel with the horizon line and passing through said first point, this second straight line representing in a true manner the plot on the ground of the origin on the ground of said second approach path;
      (iv) a second assistance gate placed under the horizon line and representing the slope of said second approach path seen from the aircraft; and
      (v) a synthetic runway, defined around said first point, this synthetic runway representing in a true manner the plot on the ground of the sides of the landing runway where said first and second approach paths originate.

15. The device as claimed in claim 14, wherein said first and second means are part of at least one detector of a precision approach system.

16. The device as claimed in claim 14, wherein said first and second means are part of a non-precision approach aid system.

17. The device as claimed in claim 14, wherein it comprises, in addition, a third means for resetting said heading scale by shifting it laterally in such a way as to align said second point on a route followed by the aircraft during the approach phase.

18. An aircraft, comprising the device of claim 14.

* * * * *